United States Patent
Estes

(10) Patent No.: US 10,650,120 B2
(45) Date of Patent: May 12, 2020

(54) DIGITAL MEDIA REPRODUCTION AND LICENSING

(71) Applicant: Media Chain LLC, Miami, FL (US)

(72) Inventor: Christopher A. Estes, Miami, FL (US)

(73) Assignee: Media Chain, LLC, Miami, FL (US)

(*) Notice: Subject to any disclaimer, the term of this patent is extended or adjusted under 35 U.S.C. 154(b) by 36 days.

(21) Appl. No.: 16/150,944

(22) Filed: Oct. 3, 2018

(65) Prior Publication Data

US 2019/0034599 A1 Jan. 31, 2019

Related U.S. Application Data

(63) Continuation of application No. 15/898,978, filed on Feb. 19, 2018, which is a continuation of application No. 15/659,175, filed on Jul. 25, 2017, now Pat. No. 9,898,590, which is a continuation of application No. 13/667,629, filed on Nov. 2, 2012, now Pat. No. 9,715,581.

(60) Provisional application No. 61/555,810, filed on Nov. 4, 2011.

(51) Int. Cl.
*G06Q 30/02* (2012.01)
*G06F 21/10* (2013.01)

(52) U.S. Cl.
CPC ............ *G06F 21/10* (2013.01); *G06Q 30/02* (2013.01)

(58) Field of Classification Search
CPC ... H04L 2463/101; G06F 21/00; G06F 21/10; G06F 21/105; G06F 21/16
See application file for complete search history.

(56) References Cited

U.S. PATENT DOCUMENTS

| | | | |
|---|---|---|---|
| 6,920,567 B1* | 7/2005 | Doherty | G06F 21/10 |
| | | | 707/999.104 |
| 6,941,275 B1* | 9/2005 | Swierczek | G06Q 30/0623 |
| | | | 705/26.61 |
| 7,676,437 B2 | 3/2010 | Satkunanathan et al. | |
| 8,151,194 B1* | 4/2012 | Chan | G06Q 30/0201 |
| | | | 715/716 |
| 8,543,395 B2* | 9/2013 | Todic | G10L 15/05 |
| | | | 704/10 |
| 8,745,647 B1* | 6/2014 | Shin | H04N 21/442 |
| | | | 725/10 |

(Continued)

OTHER PUBLICATIONS

Habermann, Online Video Analytics: YouTube Insight-Advanced Techniques, May 17, 2000.

*Primary Examiner* — Lynn D Feild
*Assistant Examiner* — Richard A McCoy
(74) *Attorney, Agent, or Firm* — Taft Stettinius & Hollister LLP

(57) ABSTRACT

Systems and methods for monetizing the reproduction of digital media content for the rights-holders of the digital media content. Embodiments of the present disclosure relate to determining whether a user of a media content item has a license to reproduce the media content item. In one embodiment, the media content item may be reproduced when the user is licensed. The user is prompted to select to acquire a license to reproduce the media content item or to decline the license to reproduce the media content item when the user is not licensed. Further embodiments determine whether a user may receive a license when the user wishes to acquire a license. In an embodiment, the user is declined a license when not approved for the license.

20 Claims, 7 Drawing Sheets

(56) References Cited

U.S. PATENT DOCUMENTS

| | | | |
|---|---|---|---|
| 9,148,706 B1* | 9/2015 | Shin | H04N 21/812 |
| 9,620,105 B2* | 4/2017 | Mason | G10L 15/02 |
| 2002/0032905 A1* | 3/2002 | Sherr | G06F 21/10 |
| | | | 725/38 |
| 2002/0072982 A1* | 6/2002 | Barton | G06Q 30/02 |
| | | | 705/14.1 |
| 2002/0117043 A1* | 8/2002 | Powley | G09B 15/02 |
| | | | 84/483.2 |
| 2002/0154157 A1* | 10/2002 | Sherr | G06F 21/10 |
| | | | 715/716 |
| 2002/0161741 A1* | 10/2002 | Wang | G06F 16/40 |
| 2003/0001887 A1* | 1/2003 | Smith, IV | G06F 16/9535 |
| | | | 715/741 |
| 2003/0149884 A1* | 8/2003 | Hernandez | G06F 21/10 |
| | | | 713/193 |
| 2003/0191941 A1* | 10/2003 | Terada | G06T 1/0021 |
| | | | 713/176 |
| 2003/0220883 A1* | 11/2003 | Block | G06F 21/10 |
| | | | 705/59 |
| 2004/0039916 A1* | 2/2004 | Aldis | G06F 21/10 |
| | | | 713/177 |
| 2004/0199387 A1* | 10/2004 | Wang | G06Q 30/06 |
| | | | 704/243 |
| 2005/0004873 A1* | 1/2005 | Pou | G06F 21/10 |
| | | | 705/51 |
| 2005/0021398 A1* | 1/2005 | McCleskey | G06Q 30/02 |
| | | | 705/14.47 |
| 2005/0060701 A1* | 3/2005 | Murase | G06Q 30/06 |
| | | | 717/178 |
| 2005/0114265 A1* | 5/2005 | Satkunanathan | G06F 21/10 |
| | | | 705/59 |
| 2005/0177844 A1* | 8/2005 | Levi | G06Q 30/02 |
| | | | 725/30 |
| 2005/0223415 A1* | 10/2005 | Oho | G06F 21/606 |
| | | | 726/27 |
| 2006/0008256 A1* | 1/2006 | Khedouri | G06Q 20/206 |
| | | | 386/234 |
| 2006/0031785 A1* | 2/2006 | Raciborski | H04L 29/06027 |
| | | | 715/859 |
| 2006/0277047 A1* | 12/2006 | DeBusk | G06K 9/00523 |
| | | | 704/273 |
| 2007/0022139 A1* | 1/2007 | Stewart | G06F 16/683 |
| 2007/0055439 A1* | 3/2007 | Denker | G01S 5/0036 |
| | | | 701/532 |
| 2007/0241176 A1* | 10/2007 | Epstein | G06F 21/10 |
| | | | 235/375 |
| 2008/0027742 A1* | 1/2008 | Maeda | G06F 21/105 |
| | | | 705/1.1 |
| 2008/0201446 A1* | 8/2008 | Svendsen | G06F 21/10 |
| | | | 709/218 |
| 2008/0243694 A1* | 10/2008 | Johnson | G06Q 30/0603 |
| | | | 705/52 |
| 2008/0249770 A1* | 10/2008 | Kim | G10L 15/08 |
| | | | 704/231 |
| 2009/0007274 A1* | 1/2009 | Martinez | G06F 21/10 |
| | | | 726/27 |
| 2009/0132074 A1* | 5/2009 | Yamada | G10H 1/00 |
| | | | 700/94 |
| 2009/0210245 A1* | 8/2009 | Wold | G06Q 10/10 |
| | | | 700/300 |
| 2010/0042652 A1* | 2/2010 | O'Donnell | G06F 21/105 |
| | | | 726/26 |
| 2010/0043046 A1* | 2/2010 | Sen | H04N 7/17318 |
| | | | 725/133 |
| 2010/0293622 A1* | 11/2010 | Nikitin | G06F 21/10 |
| | | | 726/31 |
| 2010/0324983 A1* | 12/2010 | Etchegoyen | G06F 21/10 |
| | | | 705/14.23 |
| 2011/0051914 A1* | 3/2011 | Neuman | H04M 19/04 |
| | | | 379/93.17 |
| 2011/0106633 A1* | 5/2011 | Cook | G06Q 30/02 |
| | | | 705/14.73 |
| 2011/0213721 A1* | 9/2011 | Raley | G06F 21/10 |
| | | | 705/310 |
| 2011/0276334 A1* | 11/2011 | Wang | G10L 25/48 |
| | | | 704/270 |
| 2012/0010931 A1* | 1/2012 | Mehra | G06Q 10/107 |
| | | | 705/14.16 |
| 2012/0096339 A1* | 4/2012 | Cohen | H04L 67/06 |
| | | | 715/221 |
| 2012/0109834 A1* | 5/2012 | Bongiovanni | G06Q 10/06 |
| | | | 705/317 |
| 2012/0123831 A1* | 5/2012 | King | G06Q 30/0274 |
| | | | 705/14.7 |
| 2012/0123916 A1* | 5/2012 | Shintani | G06Q 30/0251 |
| | | | 705/30 |
| 2012/0124638 A1* | 5/2012 | King | G06Q 10/101 |
| | | | 726/1 |
| 2012/0191599 A1* | 7/2012 | Rigby | G06F 21/10 |
| | | | 705/40 |
| 2012/0303490 A1* | 11/2012 | Hill | G06Q 30/00 |
| | | | 705/27.2 |
| 2013/0047271 A1* | 2/2013 | Tang | G06F 21/10 |
| | | | 726/30 |
| 2013/0051772 A1* | 2/2013 | Ramaswamy | H04N 21/25875 |
| | | | 386/291 |
| 2013/0065213 A1* | 3/2013 | Gao | G10H 1/365 |
| | | | 434/307 A |
| 2014/0108029 A1* | 4/2014 | Kim | G06Q 50/22 |
| | | | 705/2 |
| 2015/0040002 A1* | 2/2015 | Kannan | G06F 3/0482 |
| | | | 715/246 |

* cited by examiner

DIGITAL MEDIA REPRODUCTION AND LICENSING

CROSS-REFERENCE

The present application is a continuation application of U.S. patent application Ser. No. 15/898,978, filed Feb. 19, 2018, and claims the benefit of U.S. Pat. No. 9,898,590, filed Jul. 25, 2017, and claims the benefit of U.S. Pat. No. 9,715,581, filed Nov. 2, 2012, and claims the benefit of U.S. Provisional Patent Application No. 61/555,810, filed Nov. 4, 2011, which are incorporated herein by reference in their entirety.

TECHNICAL FIELD

Embodiments relate to licensing digital media for reproduction, and more specifically to a digital media licensing system for licensing and enabling reproduction of digital media on a reproduction device.

BACKGROUND

Conventionally, the distribution of media content, such as music, movies, and books for example, is in large part controlled by owners who are the rights-holders of the media content. In conventional systems, the media content is incorporated into a physical media such as a compact disk (CD), a digital video disk (DVD), a printed publication, and/or any other physical media. In such conventional systems, the rights-holders of the media content are able to control licensing of the media content, the production of physical media copies of the media content, and/or the distribution of the media content to customers and/or third party retailers and thereby monetize the media content.

There has been a dramatic shift in the marketplace away from media content distributed on physical media to digital media content that may be distributed via the internet. Conventionally, rights-holders of digital media content have significantly less control over the distribution of such digital media content as compared to the distribution of physical media. For example, a party that does not hold rights of the digital media content may reproduce the digital media content and then distribute the digital media content via the internet without the permission of the actual rights-holder of the digital media content. As a result, the actual-rights holder of the digital media content cannot monetize the unauthorized distribution of the digital media content.

The inability of rights-holders of digital media content to monetize the unauthorized distribution of the digital media content limits the financial gain that rights-holders of the digital media content obtain in creating the original digital media content. Often times such unauthorized distribution of the digital media content prohibits the rights-holders of the digital media from covering the costs of creating the original digital media content which discourages creation of digital media content.

BRIEF SUMMARY

Embodiments relate to monetizing the reproduction of digital media content for the rights-holder of the digital media content. In an embodiment, a computer implemented method provides a multimedia hardware device a capability to generate an authorized reproduction of a media content item included in a digital media file. A digital media file that includes a media content item may be loaded for reproduction. The digital media file may be analyzed to identify digital media information associated with the media content item. A license database may be accessed to determine whether a user is licensed to reproduce the media content item based on the digital media information. The media content item may be reproduced when the user is licensed to reproduce the media content item based on the digital media information. A licensing query may be provided to the user when the user is not licensed to reproduce the media content item to prompt the user to select to acquire a license to reproduce the media content item or to decline the license to reproduce the media content item.

In another embodiment, a system provides a media content licensing and verification system to license media content for reproduction. A transceiver may receive a media licensing request from an external device associated with a user. The media licensing request may include digital media information associated with a media content item included in a digital media file. A processor may access a media catalog database that includes a plurality of media content records where a media content record from the plurality of media content records is associated with the media content item. The processor may also determine whether the media licensing request is to be granted based on the media content record stored in the media catalog database that is associated with the media content item. The processor may grant the media licensing request for the external device when the media content record associated with the media content item verifies the granting of the license for the media content item to the external device. The processor may also decline the media licensing request for the external device when the media content record associated with the media content item does not verify the granting of the license for the media content item to the external device.

Further embodiments, features, and advantages, as well as the structure and operation of the various embodiments, are described in detail below with reference to the accompanying drawings.

BRIEF DESCRIPTION OF THE DRAWINGS

Embodiments are described with reference to the accompanying drawings. In the drawings, like reference numbers may indicate identical or functionally similar elements.

DETAILED DESCRIPTION

The digital media file licensing and authorized reproduction system provides a capability to ensure that a user possesses a license to reproduce a digital media file and if the user does not have a license, providing to the user the option to obtain such a license. In the Detailed Description herein, references to "one embodiment", "an embodiment", an "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to effect such feature, structure, or characteristic in connection with other embodiments whether or not explicitly described.

Overview

Figure 1:
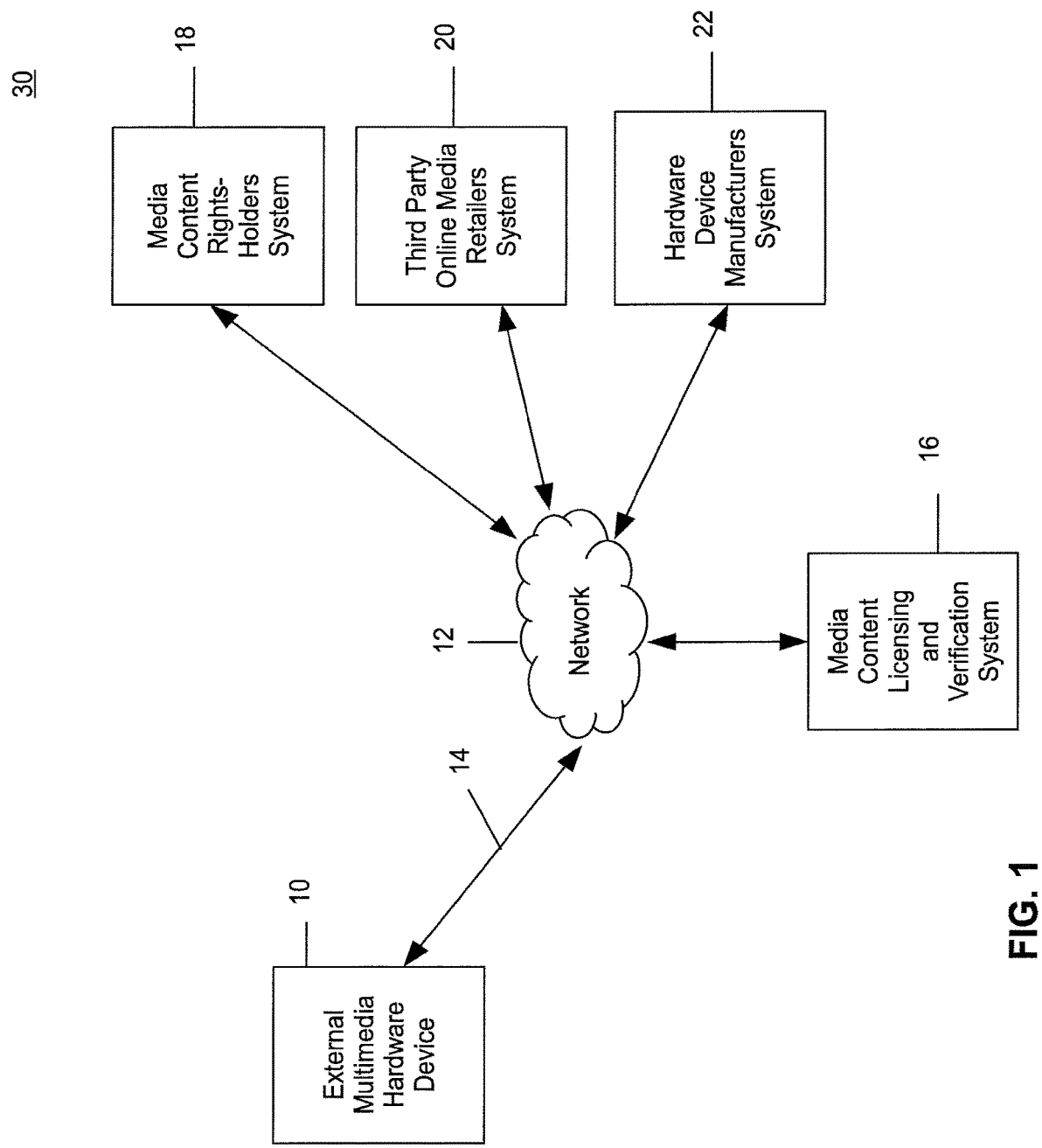
FIG. 1 illustrates a digital media file licensing and authorized reproduction system, according to an embodiment.

FIG. 1 illustrates a digital media file licensing and authorized reproduction system 30 in which embodiments or portions thereof, may be implemented. Digital media file licensing and authorized reproduction system 30 includes an external multimedia hardware device 10, a network 12, a media content licensing and verification system 16, a media content rights-holders system 18, a third party online media retailers system 20, and a hardware device manufacturers system 22.

System 30 may monetize the reproduction of a media content item included within a digital media file. Reproduction of a media content item may include reproducing sound from a digital audio file, reproducing video from a digital video file, reproducing text from a digital text file, and/or any other reproduction of a digital media file that will be apparent to those skilled in the relevant art(s) without departing from the spirit and scope of the disclosure.

Reproduction may be defined as a first use by a user of the media content item. For example, reproduction of the media content item may include when a user first accesses a media content item where the user obtained the media content item from an outside source, such as but not limited to a third party online media distributor. Reproduction may also be defined as further distribution of the media content item by the user after the user has initially accessed the media content item. For example, reproduction of the media content item may include when the user distributes the media content item to other parties after the user has obtained the media content item from the third party online media distributor.

A digital media file may represent a MPEG Layer 3 (MP3) file, a RealAudio (RA) file, a raw sample (RAW) file, a Microsoft wave (WAV) file, a Windows Media Audio (WMA) file, and/or any other suitable digital media file that will be apparent to those skilled in the relevant art(s) without departing from the spirit and scope of the disclosure. The media content item may include any portion of data included in the digital media file. A user of external multimedia hardware device 10 may reproduce the media content item with external multimedia hardware device 10. Device 10 may represent a smart phone, a smart tablet, a mobile telephone, a television, an audio system, a personal music player, a portable computing device, other computing devices such as a personal computer, a laptop, or a desktop computer, computer peripheral such as a printer, a portable audio/or a video player, and/or any other suitable electronic device that can reproduce a media content item that will be apparent to those skilled in the relevant art(s) without departing from the spirit and scope of the disclosure.

However, the user may not have a license that authorizes the user to reproduce the media content item. The digital media file including the media content item may have been procured from various sources that are not licensed to reproduce the media content item and do not collect licensing fees for use of the media content item. As such, when the user loads the digital media file for reproduction, device 10 may analyze the digital media file to determine the media content item included in the file and determine whether the user of device 10 is authorized. For example, the device may analyze a digital music file to identify the song and artist of the media content item that may be a track included in the digital music file. The user may be authorized when the user has a license to load and/or reproduce a media content item included in the digital media file.

In an embodiment, device 10 may analyze a plurality of identifying characteristics associated with the media content item to identify the media content item and to determine whether the user of device 10 is authorized. The plurality of identifying characteristics may be an identifying characteristic associated with the media content item inherently present in the media content item such that the media content item is not remastered to include the identifying characteristic after the media content item is initially recorded. The plurality of identifying characteristics can represent a fingerprint, digital watermarking, and/or any other suitable algorithm to identify copyright ownership of the media content item included in the digital media file that will be apparent to those skilled in the relevant art(s) without departing from the spirit and scope of the disclosure. In an embodiment, device 10 may analyze metadata included in the loaded digital media file to identify the media content item included in the digital media file.

System 30 may query a license database locally and/or remotely located to system 30 to determine whether the user of device 10 has the appropriate license for the media content item. Device 10 may refuse to play the digital media file and query the user to determine whether the user wishes to purchase the appropriate license when the user does not have the appropriate license.

Device 10 may communicate with media content licensing and verification system 16 over network 12 and transmit the fingerprint of the media content item to media content licensing and verification system 16 when the user selects to purchase the appropriate license. Licensing system 16 may identify the media content item based on the received fingerprint. Licensing system 16 may transmit back to device 10 the title and/or other information associated with the identified media content item and request the user to confirm purchase of the license. The user may interface with device 10 to conduct the licensing transaction with licensing system 16, and after purchasing the license, licensing system 16 may transmit a license to device 10. After receiving the license from licensing system 16, device 10 may commence reproduction of the media content item. Moreover, licensing system 16 may store are cord of the transaction for statistical purposes, and/or store a copy of the license in a database under a user record associated with the user of device 10.

Device 10 and licensing system 16 may provide data associated with the use of the media content item to media content rights-holders system 18 over network 12. Rights-holders system 18 may be accessed by an owner of a copyright for the media content item. For example, device 10 and licensing system 16 may provide data to rights-holders system 18 that includes the user who is accessing the media content item, the geographic location of the user who is accessing the media content item, other media content items that the user may be accessing, the quantity of times the media content item is accessed, and/or any other data associated with the use of the media content item that will be apparent to those skilled in the relevant art(s) without departing from the spirit and scope of the disclosure.

The data provided by device 10 and licensing system 16 to rights-holders system 18 for the media content item may be used by the copyright owner to develop future licensing agreements that may be provided to the user of device 10 by licensing system 16 for future use of the media content item. Payments for the license to use the media content item may be received from the user via device 10 and licensing system 16. Payments may also be distributed to the copyright owner via rights-holders system 18.

Device 10 and licensing system 16 may also provide data associated with the use of the media content item to third party online media retailers system 20. The data provided to retailers system 20 may be similar to the data provided to rights-holders system 18. However, retailers system 20 may be accessed by third party online media retailers who have been selected by the copyright owner of the media content item to distribute the media content item via the Internet.

The data provided by device 10 and licensing system 16 to retailers system 20 for the media content item may be used by the third party online retailers to develop future pricing for their online media content item distribution including which media content items to distribute in the future. The data provided to retailers system 20 may also be used to help third party online media retailers target the marketing of the media content item to demographics that have shown a trend of interest in the media content item. Payments for the distribution of the media content item by the third party on line media retailer may be received from the user via device 10 and licensing system 16. Payments may also be distributed to the third party online media retailer via retailers system 20.

Device 10 and licensing system 16 may also provide data associated with the use of the media content item to hardware device manufactures system 22. The data provided to manufactures system 22 may be similar to the data provided to rights-holders system 18 and retailer system 20. However, manufactures system 22 may be accessed by hardware device manufacturers who manufacture the hardware that may be implemented in device 10 that provides device 10 with the capabilities to limit reproduction of the media content item to when the user has a license to reproduce the media content item. Payments for use of the hardware provided by the hardware device manufacturers implemented in device 10 by the user of device 10 may also be distributed to the hardware device manufacturer via manufacturers system 20.

Device 10 may be configured to connect to network 12. Network 12 may include one or more networks, such as the Internet. In some examples, network 12 may include one or more network technologies such as Ethernet, Fast Ethernet, Gigabit Ethernet, a variant of the IEEE 802.11 standard such as WiFi, and the like. Communication over network 12 takes place using one or more network communication protocols including reliable streaming protocols such as transmission control protocol (TCP). These examples are illustrative and not intended to limit the present disclosure. As shown in FIG. 1, device 10 may engage in communication with network 12 via connection 14, where connection 14 may be a wireless, wired, a secured communication connection, any combination thereof, and/or any other communication connection that will be apparent to those skilled in the relevant art(s) without departing from the spirit and scope of the disclosure.

Licensing system 16 may be configured to engage in communication with network 12. As such, device 10 may communicate with licensing system 16 via network 12. Additionally, rights-holders system 18, retailers system 20, and/or manufacturers system 22 may also communicate with licensing system 16 and device 10 via network 12. Licensing system 16, rights-holders system 18, retailers system 20, and/or manufacturers system 22 may engage in communication with network 12 via a communication connection similar to connection 14.

Device 10, licensing system 16, rights-holders system 18, retailers system 20, and/or manufacturers system 22 may have a cloud computing configuration. Device 10, licensing system 16, rights-holders system 18, retailers system 20, and/or manufacturers system 22 may share resources via network 12. For example, device 10 may retrieve licensing information for the user of device 10 who wishes to reproduce the media content item via network 12. Licensing system 16 may also update rights-holders system 18 with the user information for the user who wishes to reproduce the media content item. Based on the cloud computing configuration, the interaction between device 10, licensing system 16, and rights-holders system 18 may not be limited to a single external multimedia hardware device. A plurality of external multimedia hardware devices may update licensing system 16 and rights-holders system 18 via network 12 with user information of users wishing to reproduce the media content item. Licensing system 16 may provide each of these updates for the user information to any media content rights-holders system that requests the user information.

Digital Media File Licensing and Authorized Reproduction System

Figure 2:
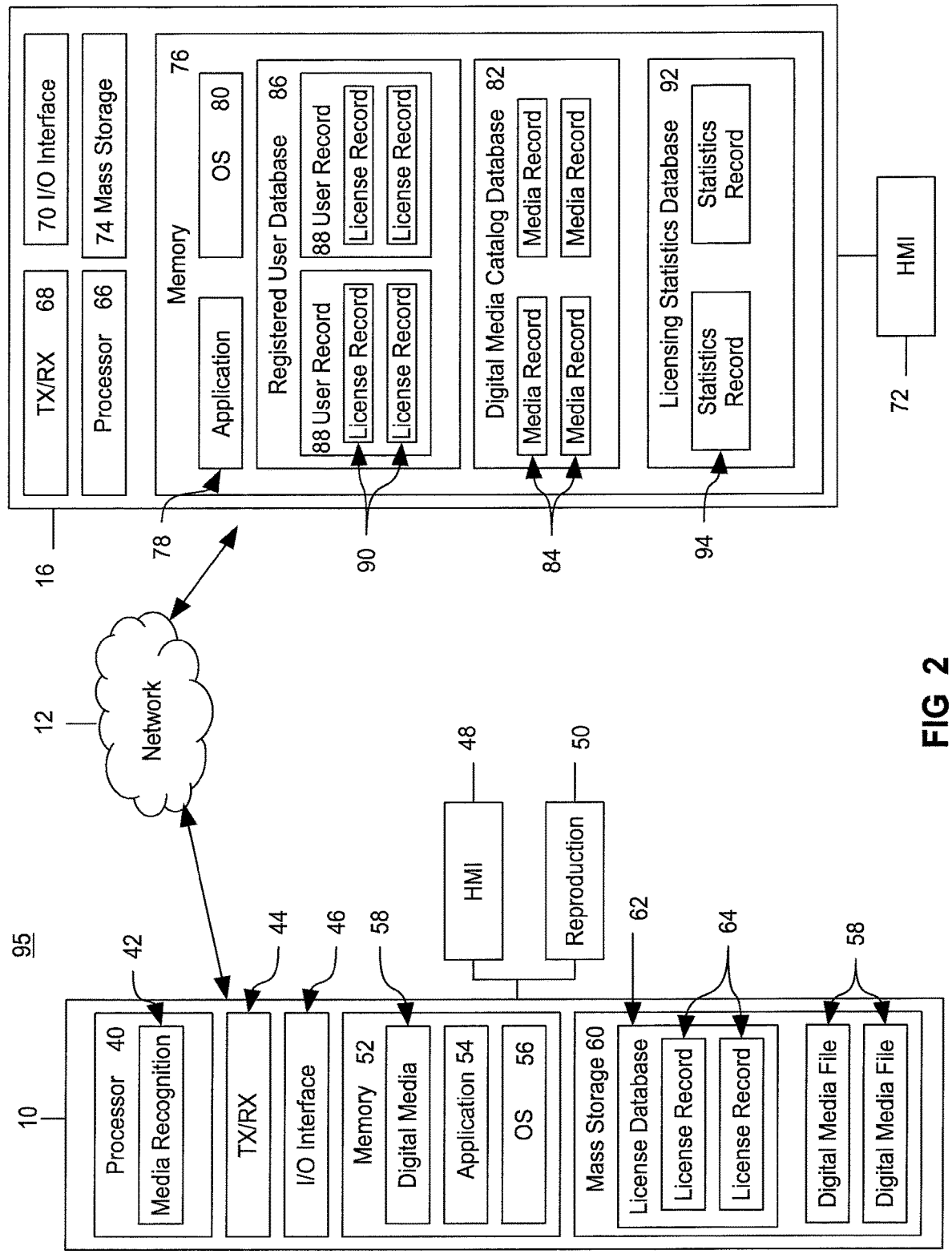
FIG. 2 illustrates a second digital media file licensing and authorized reproduction system, according to an embodiment.

FIG. 2 illustrates a second digital media file licensing and authorized reproduction system 95 in which embodiments or portions thereof, may be implemented. Digital media file licensing and authorized reproduction system 95 includes external multimedia hardware device 10, media content licensing and verification system 16, and network 12. External multimedia hardware device 10 includes a processor 40, a transceiver 44, an input/output interface 46, a memory 52, a mass storage 60, a human machine interface (HMI) 48 and a reproduction module 50. Processor 40 may be a hardware based processor that includes a general purpose microcontroller, a special purpose microcontroller and/or any other controller that will be apparent to those skilled in the relevant art(s) without departing from the spirit and scope of the disclosure.

Processor 40 includes a media recognition module 42. Media recognition module 42 may be configured to analyze a loaded digital media file to identify the media content item included in the digital media file and/or determine an identifying characteristic, such as a fingerprint for example, of the media content item. In an embodiment, the media recognition module 40 may include hardware based circuitry configured to analyze a loaded digital media file. In an embodiment, the media recognition module 42 may include program code executing on the processor 40 configured to cause the processor 40 to analyze a loaded digital media file.

Memory 52 includes a digital media file 58, an application 54, and an operating system (OS) 56. Memory 52 may be accessed by processor 40, such that processor 40 may read data from memory 52 and write data to memory 52. In some embodiments, application 54 and/or OS 56 may include program code including one or more instructions, that when executed by processor 40 cause device 10 to perform the steps necessary to execute steps or elements embodying the various aspects of the disclosure. Furthermore, digital media file 58 may be loaded for reproduction.

Mass storage 60 includes a license database 62 and digital media file 58. License database 62 includes a license record 64. Mass storage 60 may be utilized in addition to memory 52, or may not be included at all, in which case the data elements illustrated as stored on mass storage 60 would be stored in memory 52. For exemplary purposes, mass storage 60 includes digital media files 58, illustrating that one or more digital media files 58 may be stored in mass storage 60 of device 10. Moreover, mass storage 60 includes a license database 62, where license database 62 includes one or more license records 64. In an embodiment, license database 62 includes license records 64, where license records 64 indicate a media content item that a user of the device may be licensed to reproduce.

Media content licensing and verification system 16 includes a transceiver 68, a processor 66, an input/output interface 70, a mass storage 74, a memory 76, and a HMI 72. Memory 76 includes an application 78, an OS 80, a registered user database 86, a digital media catalog database 82, and a licensing statistics database 92. Application 78 and/or the OS 80 may include program code including one or more instructions configured to be executed by processor 66 to cause licensing system 16 to perform steps necessary to perform embodiments of the disclosure.

Registered user database 86 includes a user record 88. User record 88 includes a license record 90. Digital media catalog database 82 includes a media record 84. Each media record 84 includes data associated with a unique media content item loaded into the licensing system 16. As such, a rights-holder or content creator may load a catalog of media content items that may include but not limited to a song, a movie, a television show, a novel, and/or any other media content item into licensing system 16. Licensing system 16 may analyze each media content item in the catalog, and generate a media record corresponding to each media content item. In some embodiments, each media record may include data indicating various information of the corresponding media content item, including but not limited to the rights-holder of the media content item, the title of the media content item, the plurality of identifying characteristics, and/or any other information associated with the corresponding media content item that will be apparent to those skilled in the relevant art(s) without departing from the spirit and scope of the disclosure.

Each user record 88 may be associated with a unique user and indicates all media content items the user has purchased a license for. Each user record 88 may include one or more license records 90, where each license record may include data indicating a media content item that the user is licensed to reproduce.

Licensing statistics database 92 includes a statistics record 94. Each statistics record 94 may include data indicating a license purchased by a user connecting to licensing system 16. The data may include, for example, whether a user that purchased a license for a particular media content item, how many users refused to license a particular media content item, the rights-holder of the media content item for which the license was purchased, the title of the media content item, demographic information for the user that may include but is not limited to age, gender, location, and/or any other data that may be associated with the user and/or license obtained by the user that will be apparent to those skilled in the relevant art(s) without departing from the spirit and scope of the disclosure.

Embodiments of the present disclosure can be implemented on any type of processing (or computing) device having one or more processors. For example, embodiments can be implemented on a workstation, mobile device, computer, cluster of computers, set-top box, or other devices having at least one processor. In an embodiment, multiple modules may be implemented on the same processing device. Software can include one or more applications and an operating system. Hardware can include, but may not be limited to, a processor, memory, and/or graphical user interface display.

Method 100

Figure 3:
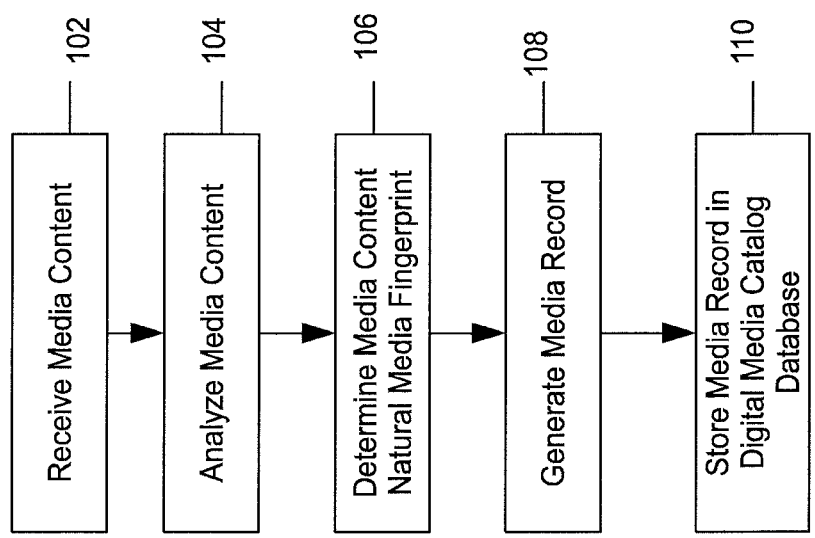
FIG. 3 illustrates a flowchart illustrating an exemplary aspect of operation for the media content licensing and verification system to analyze a received catalog of media content and manage the catalog of media content, according to an embodiment.

FIG. 3 illustrates a flowchart of an exemplary method 100 of processing a digital media catalog for use in a media content licensing and verification system. At step 102, the media content licensing and verification system receives digital media catalog. At step 104, each media content item of the received catalog may be analyzed.

At step 106, a plurality of identifying characteristics associated with the media content item may be determined. For example, the fingerprint of the media content item may be determined. Determining a media content fingerprint may include one or more steps for analyzing the digital file including the media content item to determine one or more characteristics that uniquely identify the media content item stored therein. For example, if the media content item were a book stored in a digital text file, the natural media fingerprint may be determined to be a predefined number of words from the beginning of the text file.

In another exemplary embodiment, the media content item may be a song stored in a digital music file, and the system may determine the natural media fingerprint by analyzing the digital music file to identify lyrics included in the song, notes played in the song, and/or a sampled sound wave included in the song. These characteristics may be considered individually or in various combinations to uniquely identify the song. Moreover, in many digital media file formats, one or more information fields related to the media content item stored in the file are included in metadata of the file. In an embodiment of the invention, the system may analyze metadata included in the digital media file to identify the media content item stored thereon.

In step 108, the system generates a media record for each media content item, where the media record includes data indicating the fingerprint, rights-holder information, title, and/or any other media content item data. In step 110, the media record is stored in a digital media catalog database accessible by the system.

Embodiments can work with software, hardware, and/or operating system implementations other than those described herein. Any software, hardware, and operating system implementations suitable for performing the functions described herein can be used.

Method 120

Figure 4:
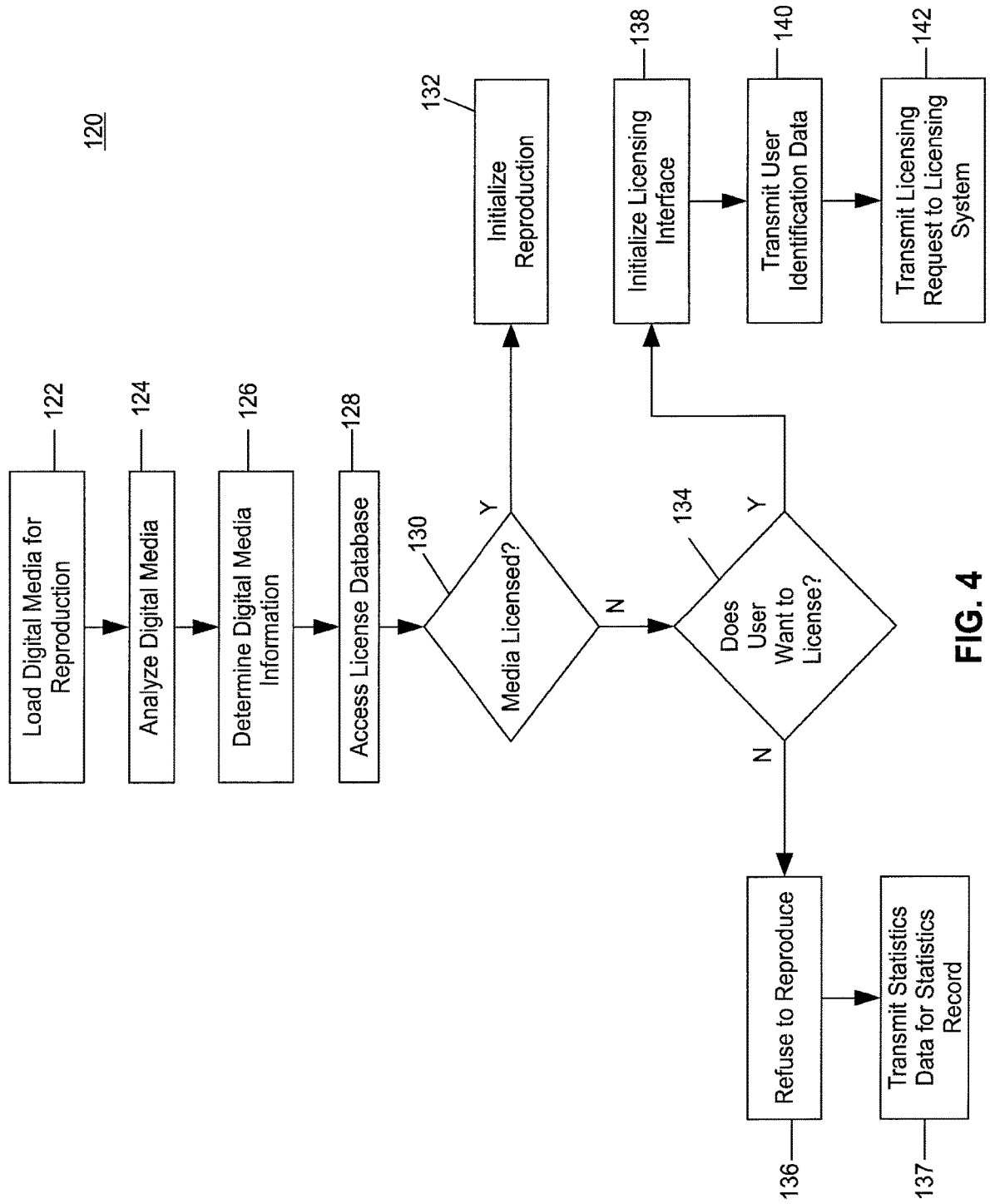
FIG. 4 illustrates a flowchart illustrating an exemplary aspect of operation for the external multimedia hardware device, according to an embodiment.

FIG. 4 illustrates a flowchart of an exemplary method 120 of verifying that a digital media file has been licensed prior to reproduction and facilitating the purchase of a license if the digital media file has not been properly licensed prior to reproduction. At step 122, a digital media file is loaded for reproduction on the external multimedia hardware device. At step 124, the device analyzes the digital media file.

At step 126, information associated with the digital media file is determined. Information associated with the digital media file may include a fingerprint associated with the media content item included in the digital media file, the rights-holder of the media content item, the title of the media content item, and/or any other digit al media file information that will be apparent to those skilled in the relevant art(s) without departing from the spirit and scope of the disclosure. For example, as described above with respect to FIG. 3, the device may analyze the digital media file to determine one or more characteristics of the media content item stored thereon, where the characteristics may be utilized alone and/or in various combinations to identify the media content item.

The selected characteristics may be referred to as the natural media fingerprint of the media content item. Advantageously, the natural media fingerprint identifies a media content item, even considering the possibility of different versions of the same media content item. For example, multiple versions of a song are recorded at various times and may be stored as digital music files, such as a live version and a studio version. However, by analyzing the characteristics of a media content item, different versions of the same song may be consistently identified. For example, analyzing characteristics may include analyzing word recognition of lyrics, the occurrence of various frequencies at particular points in time in relation to the occurrence of the lyrics, and/or any other media content item characteristic that will be apparent to those skilled in the relevant art(s) without departing from the spirit and scope of the disclosure.

At step 128, the device accesses a license database. At step 130, whether a user of the device has a license for the digital media file may be determined based on the natural media fingerprint and/or other digital media information, such as metadata, included in the digital media file. At step 132, the device initializes reproduction of the digital media file in response to the determining that the user has the appropriate license.

At step 134, the device generates a display query asking the user whether the user would like to purchase a license for the digital media file in response to determining that the user does not have the appropriate license. The device generates a display query asking the user whether the user would like to purchase a license for the digital media file.

At step 136, the device indicates to the user that the digital media file cannot be played in response to the user indicating that the user would not like to purchase a license. At step 137, the device transmits statistics related to the media content item stored on the digital media file to the media content licensing and verification system. The statistics information may include, for example, the determined natural media fingerprint of the media content item stored in the digital media file and/or any other such information related to the media content item, the digital media file, the external multimedia hardware device, and/or the user of the device.

At step 138, the device initializes a licensing interface in response to the user indicating that the user would like to purchase the license. The device initializes a licensing interface that includes establishing a secure communication connection to a media content licensing and verification system.

At step 140, the device transmits user identification data to the system, such that the user of the device may be identified to log into a user account associated with the user, process the licensing transaction, and/or for other such reasons to facilitate purchasing a license for the media content item. The user identification data may include for example, a user name and password, a unique identifier associated with the user, the user's billing information, and/or any other user identification data that will be apparent to those skilled in the relevant art(s) without departing from the spirit and scope of the disclosure.

At step 142, the device transmits a licensing request to the system, where the request includes information corresponding to the digital media file and the media content item included in the digital media file, such as the fingerprint of the media content item, the title of the media content item, the rights-holder of the digital media file, and/or other media content item information that will be apparent to those skilled in the relevant art(s) without departing from the spirit and scope of the disclosure.

Embodiments can work with software, hardware, and/or operating system implementations other than those described herein. Any software, hardware, and operating system implementations suitable for performing the functions described herein can be used.

Method 160

Figure 5:
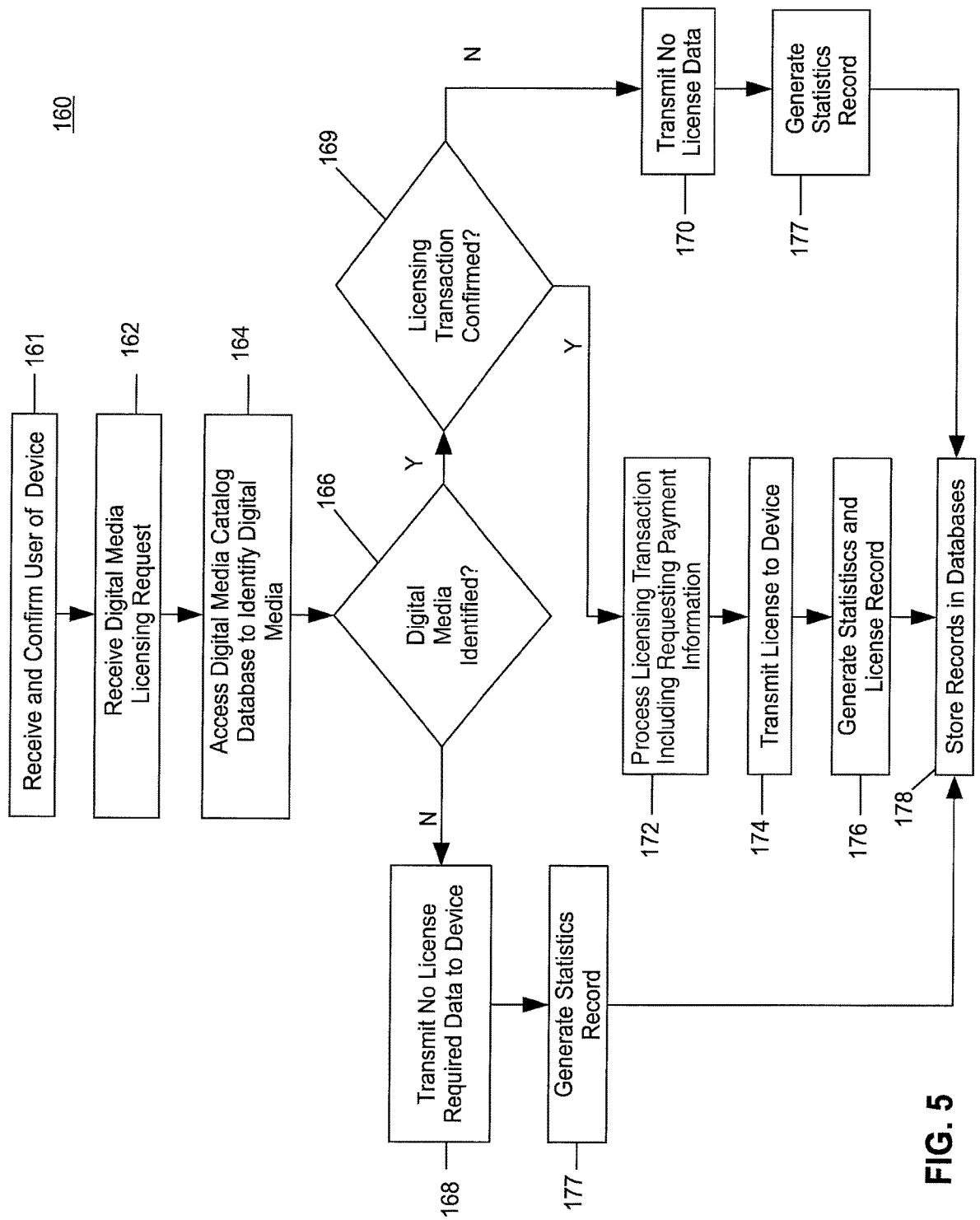
FIG. 5 illustrates a flowchart illustrating an exemplary aspect of operation for the media content licensing and verification system to receive a payment for a license to reproduce a digital media file, according to an embodiment.

FIG. 5 illustrates a flowchart of an exemplary method 160 of processing a license request from an external multimedia hardware device. At step 161, prior to initializing the licensing transaction, the system receives the user identification data and confirms the user's identity. For example, the system logs the device into a secured transaction interface associated with an account of the user.

At step 162, the system receives a digital media licensing request from an external multimedia hardware device over a network where the licensing request includes data indicating a media content item that a user of the device wishes to acquire a license for. In an embodiment, the licensing request includes a fingerprint of the media content item, information identifying the rights-holder of the media content item, the title of the media content item, and/or other media content item information.

At step 164, the system accesses a digital media catalog database to identify the media content item indicated by the request. At step 166, the system matches the fingerprint of the media content item included in the license request to a fingerprint in the digital media catalog database to identify the media content item associated with the licensing request, the rights-holder associated with the media content item, the price required for a license for the media content item, and/or any other identification information that will be apparent to those skilled in the relevant art(s) without departing from the spirit and scope of the disclosure.

At step 168, the system transmits data to the device indicating that a license is not required for reproduction in response to determining that a record corresponding to the media content item is not in the digital media catalog database. At step 169, the system transmits data to the device such that a user of the device may confirm a transaction to acquire the license associated with the media content item in response to identifying the media content item associated with the licensing request. In an embodiment, the system transmits data indicating the title of the media content item, the rights-holder of the media content item, an artist associated with the media content item, and/or other media content information such that the device presents this information to the user when asking the user whether to confirm the transaction.

At step 170, the system transmits data to the device indicating that the license has not been purchased in response to the user declining the licensing transaction, at which point, the device may refuse to reproduce the digital media file for the user. At step 172, the system processes the licensing transaction in response to the user confirming the licensing transaction and the system receiving confirmation data from the device. The processing may include collecting payment information, charging previously known payment information, debiting a user account, and/or any other such payment processing methods.

At step 174, the system transmits a license associated with the media content item over the communication network to the device in response to processing the licensing transaction. At step 176, the system generates a license record indicating the user and the media content item in response to processing the transaction, the system generates a transaction record including data that identifies the user, the media content item, demographic information about the user, and/or any other license record information that will be apparent to those skilled in the relevant art(s) without departing from the spirit and scope of the disclosure.

At step 177, the user has not purchased a license for a media content item, either because the media content item is not identified in the database or because the user refuses to make the purchase. However, a statistics record may be generated. The statistics data may include for example the natural media fingerprint associated with the media content item, the rights-holder of the media content item, the title of the media content item, and/or any other statistical data. The statistics data generated may be utilized for a variety of purposes, including for example, encouraging non-participating rights-holders from participating in the system by identifying the number of times a license was requested for a media content item owned by the non-participating rights-holder. At step 178, the statistics record is stored in the licensing statistics database, and the license record is stored in the registered user database in a user record associated with the user.

Embodiments can work with software, hardware, and/or operating system implementations other than those described herein. Any software, hardware, and operating system implementations suitable for performing the functions described herein can be used.

Method 180

Figure 6:
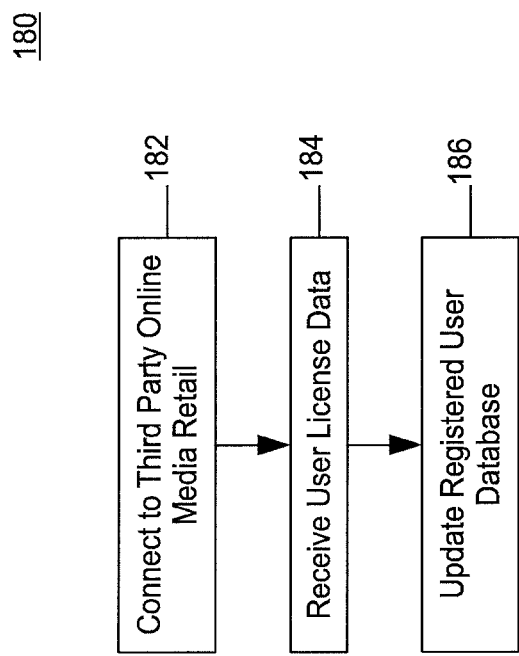
FIG. 6 illustrates a flow chart illustrating an exemplary aspect of operation for the media content licensing and verification system to receive licensing information from a third party media retailer, according to an embodiment.

FIG. 6 illustrates a flowchart of an exemplary method 180 of loading licenses for media content items associated with a user from third party sources. At step 182, the system connects to a third party online media retailer. At step 184, licenses purchased from the third party retailers may be uploaded into a registered user database of the system. At step 186, after receiving the user license data, the system updates the registered user database of the system.

Embodiments can work with software, hardware, and/or operating system implementations other than those described herein. Any software, hardware, and operating system implementations suitable for performing the functions described herein can be used.

Method 200

Figure 7:
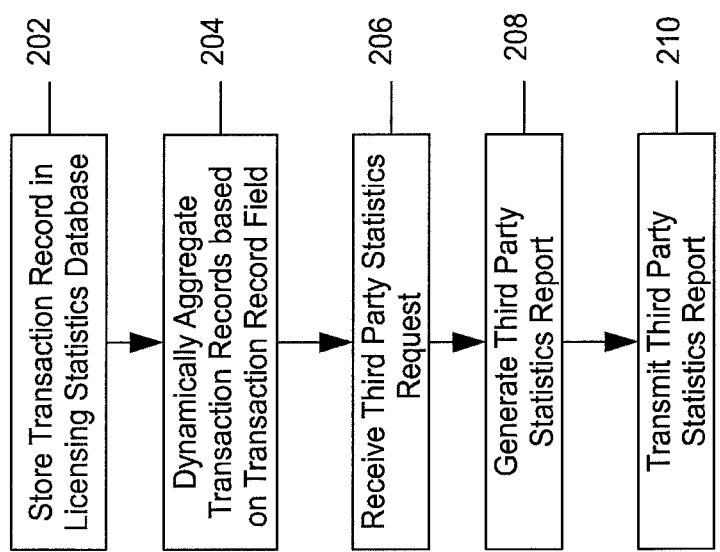
FIG. 7 illustrates a flow chart illustrating an exemplary aspect of operation for the media content licensing and verification system to receive a third-party request for licensing statistics.

FIG. 7 illustrates a flowchart of an exemplary method 700 of providing statistics associated with licensing transactions performed by the system to a third party over a communication network consistent with embodiments of the invention. At step 202, the system stores one or more transaction records in a connected licensing statistics database.

At step 204, the system dynamically aggregates the transaction records in relation to one or more fields of information included in each transaction record. For example, the system may aggregate all transaction records stored in the licensing statistics database where the media content item of the transaction record has a desired title, and as such, data and statistics related to how many times a license was purchased for the media content item having the desired title may be retrieved. In an embodiment, similar aggregation may be performed to determine how many licenses were purchased for a particular rights-holder, titles of media content items that users of a particular demographic purchased, and/or other such relevant data and statistics.

At step 206, the system may receive a statistics request from a third party that may include but not limited to a rights-holder, a hardware manufacturer, a marketing/analytics partner, and/or other such third parties that will be apparent to those skilled in the relevant art(s) without departing from the spirit and scope of the disclosure.

At step 208, the system may generate a statistics report based on the received request. At step 210, the system may transmit the statistics report to the third party over the communication network. As such, in an embodiment a participating rights-holder may quickly retrieve licensing data and statistics for media content items that the rights-holder owns. In another embodiment, a marketing and/or analytics company may receive valuable licensing and statistics data for media content items for particular demographics of users, genres of media content items, and/or other such categories.

Embodiments can work with software, hardware, and/or operating system implementations, other than those described herein. Any software, hardware, and operating system implementations suitable for performing the functions described herein can be used.

CONCLUSION

As such, in general, some embodiments of the invent ion are directed to a system for recognizing licensed and unlicensed multi-media content by use of a natural media fingerprint recognition and license verification database and system. The system disables the use of unlicensed content and provides a secure method to license unlicensed multimedia content and distribute the licensing revenue to content owners, rights-holders, participating third-party hardware and software manufacturers, and/or other additional third parties. In some embodiments, an external multi-media hardware device includes a hardware or software read/write licensed media database module, operatively connected to a hardware or software natural media fingerprint recognition and license verification module, where the recognition and license verification module may be operatively connected to a hardware or software data encryption module. Moreover, the device may include an operating system and/or application stored on memory associated with the external multi-media hardware device. Where the operating system and/or application may be executed by a processor associated with the device to cause the processor to control one or more of the modules to perform one or more tasks associated with the one or more modules. In addition, media reproduction (e.g., audio and video playback) hardware and/or software module may be monitored and controlled by processor of the device operatively connected to, executing, and/or accessing the content fingerprint recognition and license verification module. Moreover, a physical memory device (e.g., a memory and/or a mass storage device) may be accessible by the processor during execution of the one or more operations of the operating system and/or application residing on a memory associated with the external multi-media hardware device. In some embodiments, the operating system and/or application may cause the processor to drive a peripheral device using an I/O interface to present a user of the device with a graphic user interface.

Furthermore, the external multimedia hardware device may communicate over a communication network (e.g., an internet connection, a cellular communication network connection, etc.). In some embodiments, the external multimedia hardware device may be connected to a one or more servers functioning as a media content licensing and verification system over the communication network, such as a media content licensing and verification system shown in FIGS. 1 and 2. In other embodiments, the external multimedia hardware device may be connected to a personal computer functioning as a media content licensing and verification system. For example, an external multimedia hardware device may connect to a user's personal computer over a Wi-Fi connection to verify a user has the appropriate license to reproduce a particular media content item, where the personal computer may include a plurality of licensing records associated with the user. In some embodiments, the communication connection between the device and the server may be a secure internet connection. In addition, the media content licensing and verification system may receive multi-media content items (e.g., songs, videos, books, etc.) from participating copyright owners and/or rights-holders through a catalog submissions module operatively connected to the system and executing thereon. The catalog submissions may be loaded into a natural media fingerprint creation module to generate a natural media fingerprint catalog. In addition, the system may be operatively connected to a storage device storing a registered users and licensed media database.

In addition, the media content licensing and verification system may be operatively connected to and/or execute a secure license verification and payment collection module stored on a connected storage device and/or executing on a computing system connected over the communication network. Such that the the content fingerprint and licenses verification module associated with the external multimedia hardware device may conduct license purchasing transactions by communicating over the communication network with the media licensing and verification system and/or the secure license verification and payment collection module. The secure license verification and payment collection module may be connected through the central computer controlled sub-system server (e.g. a media content licensing and verification system) and/or through a computing system in communication with the media content licensing and verification system over the communication network.

As such, the application and/or operating system executing on the external multimedia hardware device may facilitate licensing transactions for various media content items stored in the media content licensing and verification system. Furthermore, the media content licensing and verification system may include a payments distribution with real-time statistics module that may execute on the media content licensing and verification system, such that copyright owners, rights-holders, and/or participating hardware manufacturers may receive payments and statistics associated with the licensing of media content items using the media content licensing and verification system.

In some embodiments, pre-existing licenses may be submitted to the media content licensing and verification system such that the registered users and licensed media master database may be updated to include licenses for registered users purchased from third party sources, such as third party online media retailers. Where the previously purchased license data may be imported into the system over the communication network to the media content licensing and verification system from the third party sources, such as databases maintained by third parties.

It will therefore be appreciated that the invention may be implemented, for example, using program code implemented on one or more hardware-based computers, one or more processors, and/or one or more integrated circuits (e.g., semiconductors). Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.) among others.

Moreover, while the invention has and hereinafter will been described in the context of digital media files resident on a memory, the invention is not so limited. Those skilled in the art will appreciate that embodiments of the invention are capable of facilitating licensing transactions with respect to streaming digital media. For example, a media content item may be streamed to an external multimedia hardware device over a communication network, and a portion of the media content item may be stored in a local memory (e.g., buffered in a cache of a processor associated with the external multimedia hardware device) while a portion may be stored remotely on a memory device accessible by the external multimedia hardware device over a communication network. For example, a media content item may be streamed to an external multimedia hardware device over a communication network from a cloud based storage system, a digital media streaming service (e.g., Pandora, Last.fm, Spotify, iTunes, iCloud, Netflix, and/or other such services) and embodiments of the invention may analyze the media content item when loaded for reproduction and perform the operations consistent with embodiments of the invention to confirm that a user of the device has the appropriate license for the streaming media content item prior to reproducing the streaming media content item.

While the invention has been illustrated by a description of the various embodiments and the examples, and while these embodiments have been described in considerable detail, it is not the intention of the applicants to restrict or in any other way limit the scope of the invention to such detail. Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A system for determining a target demographic for media marketing, comprising:
at least one processor; and a memory coupled with the processor, the memory including instructions that when executed by the processor cause the processor to:
determine at least one identification characteristic of data within a media content item for identifying the media content item using a media fingerprint determination to determine a media fingerprint that uniquely identifies the media content item and comprises the at least one identification characteristic,
wherein the at least one identification characteristic is a characteristic unique to the data within the media content item,
wherein the data within the media content item is included in the media content item when the media content item is initially recorded and not dependent on any encoding during any mastering of the media content item,
wherein the media finger print determination comprises
determining a plurality of times corresponding to the data within the media content item,
determining, using word recognition, for each time of the plurality of times, a set of words within the data for audible rendering of the media content item uniquely corresponding to the each time,
determining, for the each time of the plurality of times, a corresponding audio frequency of the data,
determining, for the each time of the plurality of times, a data point comprising
the each time,
the corresponding set of words,
and the corresponding audio frequency,
determining the media fingerprint comprising each determined data point;
receiving a request from a user and a second request from a second user to reproduce the media content item,
after the evaluation of the request, extracting user data including first demographic data specific to first user into a first statistics record identified by the media fingerprint,
after the evaluation of the second request, extracting second user data including second demographic data different from the first demographic data specific to the second user into a second statistics record identified by the media fingerprint,
appending, using the media fingerprint, the first and second statistics record to a plurality of statistics records, also corresponding to and identified by, the media fingerprint to create an updated plurality of statistic records in a database,
receiving, from a the third party, one or more request, in response to the one or more request,
retrieving the updated plurality of statistics records from the database using the media fingerprint,
determining, using the retrieved plurality of statistics records, the target demographic based on a first demographic corresponding to the first demographic data and a second demographic corresponding to the second demographic data and a plurality of additional demographic data corresponding to the retrieved plurality of statistics records,
and, marketing the media content item to a plurality of other users corresponding to the determined target demographic.

2. The system of claim 1, wherein the processor is further configured to:
identify media content item data associated with the media content item based on the at least one identification characteristic associated with the media content item, wherein the media content item data includes an identification of a copyright owner of the media content item.

3. The system of claim 2, wherein the processor is further configured to:
aggregate the media content item data specific to the media content item that is identified based on the at least one identification characteristic associated with the media content item into a media record that is specific to the media content item that the user is requesting to stream; and
distribute a plurality of media records from each request to stream the media content item to the party other than the user to provide the party other than the user with the aggregated media content item data from each request to stream the media content item via the plurality of media records aggregated from each request to stream the media content item.

4. The system of claim 3, wherein the processor is further configured to:
receive a request from an external device associated with the user requesting to stream the media content item, and
receive a digital file associated with the media content item that the user is requesting to stream, wherein the digital file includes the at least one identification characteristic of the media content item.

5. The system of claim 4, wherein the processor is further configured to:
analyze the digital file associated with the media content item to identify the at least one identification characteristic associated with the media content item that is requested to be streamed by the user; and
identify the media content item based on the at least one identification characteristic included in the digital file to determine the copyright holder of the media content item.

6. The system of claim 5, wherein the processor is further configured to analyze metadata associated with the digital file to identify the media content item.

7. The system of claim 4, wherein the processor is further configured to: determine the media fingerprint associated with the media content item that is requested to be streamed by the user to identify the media content item, wherein the media fingerprint includes a plurality of media content item characteristics that corresponds to copyrightable content included in the media content item that identifies the media content item; and analyze each media content item characteristic included in the media fingerprint to identify the media content item based on each media content item characteristic that corresponds to the copyrightable content included in the media content item, wherein the copyrightable content is a feature included in the media content item that is copyrightable.

8. The system of claim 7, wherein the processor is further configured to:
determine the media fingerprint associated with a version of the media content item that is requested to be streamed by the user to identify the media content item, wherein the media fingerprint includes a plurality of differentiable media content item characteristics that corresponds to copyrightable content that is differentiable for each version of the media content item; and analyze the differentiable media content item characteristics included in the media fingerprint to differentiate the version of the media content item from each other version of the media content item, wherein the differentiable media content item characteristics for each version of the media content item differentiate from the differentiable media content item characteristics of each other version of the media content item.

9. The system of claim 8, wherein the processor is further configured to:

receive a license request from the external device that is associated with the user requesting to stream the media content item and includes the media fingerprint of the media content item, wherein the license request is a request from the user to obtain a license to stream the media content item.

10. The system of claim 9, wherein the processor is further configured to:

compare the media fingerprint of the media content item included in the license request to a plurality of media fingerprints stored in a digital media catalog database to identify the media content item data specific to the media content item;

aggregate the media content item data specific to the media content item that is identified based on the media fingerprint of the media content item into a media record that is specific to the media content item that the user is requesting to stream; and distribute the plurality of media records from each request to stream the media content item to the party other than the user to provide the party other than the user with the aggregated media content item data from each request to stream the media content item via the plurality of media records aggregated from each request to stream the media content item.

11. A method for configuring a multimedia hardware device to generate an authorized reproduction of a media content item included in a digital media file, comprising:

determining at least one identification characteristic of data within a media content item for identifying the media content item using a media fingerprint determination to determine a media fingerprint that uniquely identifies the media content item and comprises the at least one identification characteristic, wherein the at least one identification characteristic is a characteristic unique to the data within the media content item, wherein the data within the media content item is included in the media content item when the media content item is initially recorded and not dependent on any encoding during any mastering of the media content item, wherein the media fingerprint determination comprises determining a plurality of times corresponding to the data within the media content item, determining, using word recognition, for each time of the plurality of times, a set of words within the data for audible rendering of the media content item uniquely corresponding to the each time, determining, for the each time of the plurality of times, a corresponding audio frequency of the data, determining, for the each time of the plurality of times, a data point comprising
the each time,
the corresponding set of words,
and the corresponding audio frequency, determining the media fingerprint comprising each determined data point;

receiving a request from a user and a second request from a second user to reproduce the media content item, after the evaluation of the request, extracting user data including first demographic data specific to first user into a first statistics record identified by the media fingerprint, after the evaluation of the second request, extracting second user data including second demographic data different from the first demographic data specific to the second user into a second statistics record identified by the media fingerprint, appending, using the media fingerprint, the first and second statistics record to a plurality of statistics records, also corresponding to and identified by, the media fingerprint to create an updated plurality of statistic records in a database, receiving, from a the third party, one or more request, in response to the one or more request, retrieving the updated plurality of statistics records from the database using the media fingerprint, determining using the retrieved plurality of statistics records, the target demographic based on a first demographic corresponding to the first demographic data and a second demographic corresponding to the second demographic data and a plurality of additional demographic data corresponding to the retrieved plurality of statistics records, and, marketing the media content item to a plurality of other users corresponding to the determined target demographic.

12. The method of claim 1, further comprising: identifying media content item data associated with the media content item based on the at least one identification characteristic associated with the media content item, wherein the media content item data includes an identification of a copyright owner of the media content item.

13. The method of claim 12, further comprising:

aggregating the media content item data specific to the media content item that is identified based on the at least one identification characteristic associated with the media content item into a media record that is specific to the media content item that the user is requesting to stream; and distributing a plurality of media records from each request to stream the media content item to the party other than the user to provide the party other than the user with the aggregated media content item data from each request to stream the media content item via the plurality of media records aggregated from each request to stream the media content item.

14. The method of claim 13, further comprising:

receiving a request from an external device associated with the user requesting to stream the media content item; and receiving a digital file associated with the media content item that the user is requesting to stream, wherein the digital file includes the at least one identification characteristic of the media content item.

15. The method of claim 14, further comprising:

analyzing the digital file associated with the media content item to identify the at least one identification characteristic associated with the media content item that is requested to be streamed by the user; and identifying the media content item based on the at least one identification characteristic included in the digital file to determine the copyright holder of the media content item.

16. The method of claim 15, further comprising:

analyzing metadata associated with the digital file to identify the media content item.

17. The method of claim 14, further comprising: determining the media fingerprint further includes a plurality of media content item characteristics that corresponds to copyrightable content included in the media content item that identifies the media content item; and analyzing each media content item characteristic included in the media fingerprint to identify the media content item based on each media content item characteristic that corresponds to the copyrightable content included in the media content item, wherein the copyrightable content is a feature included in the media content item that is copyrightable.

18. The method of claim 17, further comprising:

determining the media fingerprint associated with a version of the media content item that is requested to be streamed by the user to identify the media content item, wherein the media fingerprint includes a plurality of differentiable media content item characteristics that corresponds to copyrightable content that is differentiable for each version of the media content item; and analyzing the differentiable media content item characteristics included in the media fingerprint to differentiate the version of the media content item from each other version of the media content item, wherein the differentiable media content item characteristics for each version of the media content item differentiate from the differentiable media content item characteristics for each other version of the media content item.

19. The method of claim 17, further comprising:

receiving a license request from the external device that includes the media fingerprint of the media content item, wherein the license request is a request from the user to obtain a license to stream the media content item.

20. The method of claim 18, further comprising:

comparing the media fingerprint of the media content item included in the license request to a plurality of media fingerprints stored in a digital media catalog database to identify the media content item data specific to the media content item;

aggregating the media content item data specific to the media content item that is identified based on the media fingerprint of the media content item into a media record that is specific to the media content item that the user is requesting to stream; and distributing the plurality of media records from each request to stream the media content item to the party other than the user to provide the party other than the user with the aggregated media content item data from each request to stream the media content item via the plurality of media records aggregated from each request to stream the media content item.

* * * * *